Jan. 21, 1936.   L. E. LA BRIE   2,028,614
BRAKE
Filed March 6, 1933   2 Sheets-Sheet 1
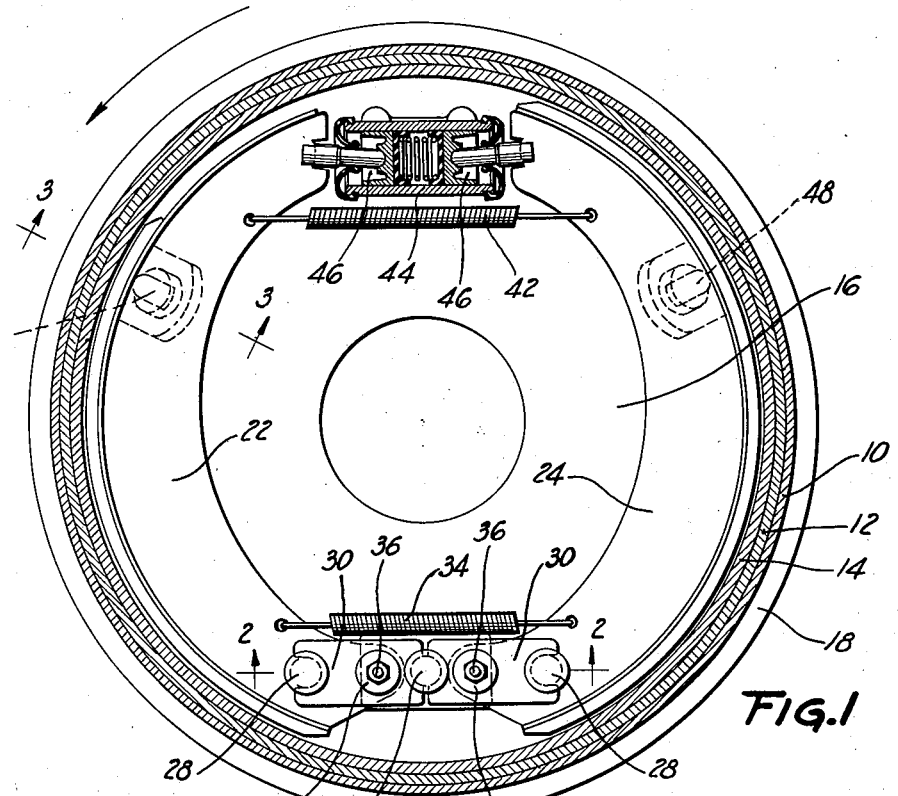
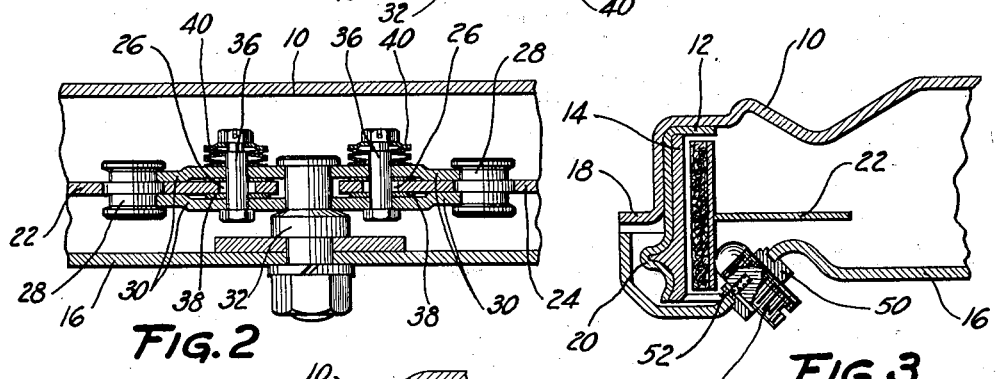
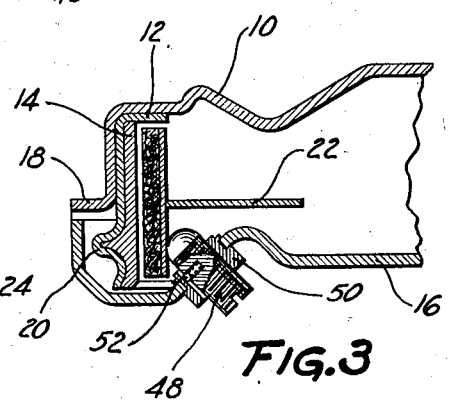
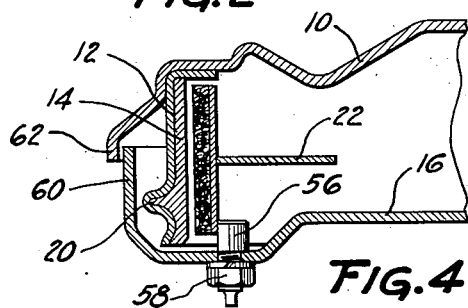
INVENTOR.
LUDGER E. LA BRIE
BY
ATTORNEY Jan. 21, 1936.   L. E. LA BRIE   2,028,614
BRAKE
Filed March 6, 1933   2 Sheets-Sheet 2

INVENTOR.
LUDGER E. LA BRIE
BY
ATTORNEY

Patented Jan. 21, 1936

2,028,614

UNITED STATES PATENT OFFICE 2,028,614

BRAKE

Ludger E. La Brie, South Bend, Ind., assignor to Bendix Aviation Corporation, South Bend, Ind., a corporation of Delaware Application March 6, 1933, Serial No. 659,869

3 Claims. (Cl. 188—78)

This invention relates to brakes, and is illustrated as embodied in an internal expanding anchored-shoe brake for an automobile. An object of the invention is to provide a simple and inexpensive brake which is of considerable power, by mounting the shoes in a novel manner so that they can adjust their positions automatically to the drum, whether or not they are substantially worn.

Preferably the shoes have frictionally pivoted in a novel manner thereon anchor links which can shift, on the application of substantial pressure, relatively to the shoes to give the desired self-adjusting action but which normally form in effect rigid parts of the shoes. The links are shown pivoted on a fixed anchor post carried by the backing plate and arranged between the ends of the shoes.

I prefer to arrange the links in pairs, the links of each pair embracing between them the end of the shoe web, and which may be notched at their ends for engagement with a pivot carried by the web. The links of each pair are shown frictionally gripped to the web by a yieldingly-held fastening carried by the links and shown passing through a large clearance opening in the shoe web, and preferably also through friction washers or the like arranged between the web and the two links respectively.

I consider it important to use, with the above-described shoes, a fluid pressure applying device (shown as including a hydraulic cylinder containing freely-movable pistons acting on the shoes), or other applying device constructed and arranged to balance its pressures on the two shoes, so that unequal self-adjustment of the two shoes will not upset the balance on the shoes of the oppositely-directed brake-applying pressures.

The adjustment of the brake is facilitated by providing the shoes with adjustable stops, the illustrated form of which embodies certain novel structures, and which can be tightened up while the brake is held applied and then backed off to give the desired clearance for the shoes in released position.

The above and other objects and features of the invention will be apparent from the following description of the illustrative embodiment shown in the accompanying drawings, in which:

Figure 1 is a vertical section through the brake, just inside the head of the brake drum, and showing the brake shoes in side elevation;

Figure 2 is a partial section on the line 2—2 of Figure 1, showing the mounting of the anchor links;

Figure 3 is a partial section on the line 3—3 of Figure 1, showing one of the adjustable stops;

Figure 4 is a section corresponding to Figure 3, but showing an alternative form of stop;

Figure 5:
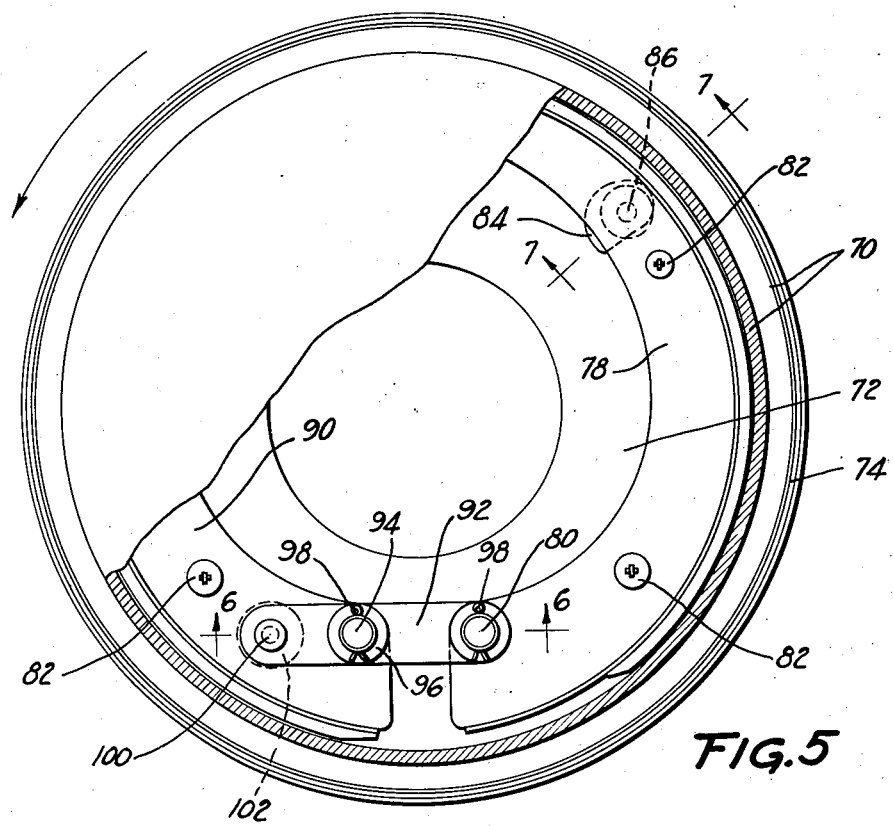
Figure 5 is an elevation, partly broken away in section to correspond to Figure 1, of a modified form of brake having some of the advantages of the invention, but in which only one of the shoes anchors through frictionally-pivoted links.

In the embodiment illustrated in Figures 1 to 4, the brake includes a rotatable drum 10 (preferably provided with a liner shell 12 welded therein and carrying a drum lining 14 of centrifugally cast iron), with a support such as a backing plate 16 which cooperates with the drum to form a substantially closed brake chamber inclosing the friction means of the brake. In the arrangement shown, the backing plate terminates adjacent a flange 18 at the mouth of the drum, forming a close annular joint which is bridged by the liner 12—14, and the liner is also preferably formed with a baffle or rib 20 arranged just inside the outer flange of the backing plate.

The illustrated brake includes shoes 22 and 24, which may be T-shaped in cross-section and, if desired, made by welding a web to a rim carrying the brake lining.

The lower end of the web of each shoe is formed with an opening 26, just above which is a transverse pivot 28. The latter is shown engaged by notches in the ends of anchor links 30 arranged on opposite sides of the shoe web, the links 30 of both shoes preferably being notched to engage and be pivoted at their other ends on an anchor post 32 carried by the backing plate and arranged between the ends of the shoes. A spring 34 holds the parts together.

Links 30, for each of the shoes, have a fastening such as a transverse pin 36 passing, with considerable clearance, through the corresponding opening 26, and preferably also through friction washers 38 arranged between the shoe web and the respective links 30. Spring washers (or equivalent spring means) 40 are mounted on the end of each of the fastenings 36, and compressed between nuts threaded on the end of the fastening and the side of the shoe web. Thus links 30 normally form rigid parts of the shoes, but can shift pivotally relatively thereto when considerable pressure is applied.

The brake is applied, against the resistance of a return spring 42, by a pressure-balancing applying device and which is most conveniently of the hydraulic or other fluid-pressure type. The illustrated device includes a hydraulic cylinder 44 mounted on the backing plate, and containing two pistons 46 acting on the respective shoes.

Each shoe is provided, preferably near its upper end, with an adjustable stop, one form of which is shown in Figure 3. This form of stop includes a setscrew 48 or the like, having a rounded end engaging (when the brake is released) the inner face of the shoe rim. The setscrew 48 is threaded through a fitting 50 riveted in an inclined portion of the backing plate, and preferably provided with a series of grooves or notches for engagement with a spring-pressed locking ball 52 carried by the setscrew. The setscrew has at its outer end a notch to receive a screw driver.

In the alternative form shown in Figure 4, the stop is in the form of an eccentric 56 having a stem extending through the backing plate and formed at its end to be grasped by a wrench, and normally held in adjusted position by a lock-nut 58. In Figure 4, the backing plate is shown with a peripheral cylindrical flange 60 fitting closely inside of a peripheral cylindrical flange 62 on the drum, forming an annular joint bridged by the liner 12—14.

The brake is adjusted most conveniently by holding it applied, tightening up the stops 48 (or 56) as far as possible, and then backing off sufficiently to give the desired clearance.

Figure 6:
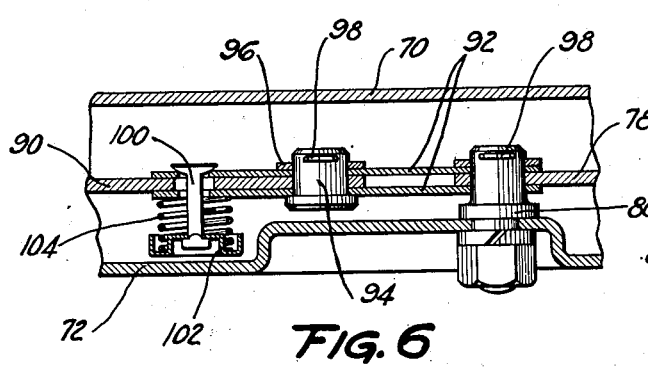
Figure 6 is a partial section on the line 6—6 of Figure 5, showing the brake anchorage.
Figure 7:
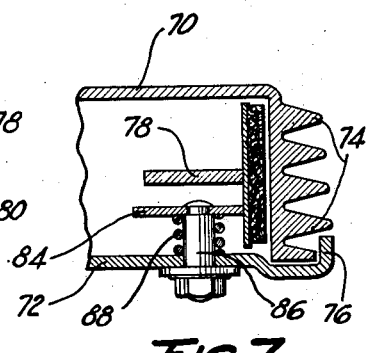
Figure 7 is a partial section on the line 7—7 of Figure 5, showing a shoe-positioning device.

In the arrangement illustrated in Figures 5–7, a drum 70 and backing plate 72 of a different type are shown; however, as in the previous modification they jointly form a substantially closed brake chamber housing the friction means of the brake.

In this case, however, the drum is a casting formed with peripheral heat-radiating and drum-stiffening ribs 74, the ones nearer the open side of the drum being deeper than those nearest the head of the drum except that the one at the extreme edge of the braking flange is machined down to fit closely inside an edge flange 76 formed on the backing plate and blocked off at its edge by the higher ribs 74 to form in effect a baffle passage between the drum and backing plate.

In this case one of the shoes, being the reverse shoe 78 which is most effective when the drum is turning clockwise and the vehicle is therefore moving backward, is directly anchored on means such as a pivot or anchor post 80 carried by the backing plate.

The shoe is provided with suitable steady rests 82 of any desired form, and its released position is determined by an adjustable stop such as an eccentric 84 engaging the rim of the shoe. The eccentric 84 is fixedly mounted on a pivot 86 by engaging the head of which with a wrench it can be turned from outside the backing plate, and is frictionally held in adjusted position by a coil spring 88 sleeved on the pivot and compressed between the eccentric 84 and the backing plate 72.

The forward shoe 90, however, has at its lower end novel frictionally pivoted thrust or anchor links 92 or the like, preferably arranged on opposite sides of the shoe web, and shown mounted at their ends on the anchor post 80 on opposite sides of the web of the shoe 78.

Links 92 may be connected to the web of the shoe 90 by means such as a pivot 94 arranged between the ends of the links. The pivot 94 and anchor 80 are shown provided at their ends with washers 96 and cotter pins 98.

The ends of the links 92 opposite the anchor post 80 are, in the illustrated arrangement, frictionally gripped to the shoe web by means shown as including a tension part 100 passing through openings in the links 92 and a slightly larger opening in the shoe web.

Part 100 has a rounded head engaging one link 92, and is riveted over at its other end to hold a washer or spring retainer 102. A coil spring 104 encircling part 100 is compressed between retainer 102 (which acts on the upper link 92 through part 100) and the lower link 92, and frictionally grips the links to the shoe web.

While two illustrative embodiments have been described in detail, it is not my intention to limit the scope of my invention to those particular embodiments, or otherwise than by the terms of the appended claims.

I claim:

1. A brake comprising a shoe with a web having an opening at its end and with a pivot a short distance from said end, a pair of anchor links on opposite side of said web and notched at their ends for pivotal engagement with said pivot, and a fastening passing through the links and through said opening and normally preventing relative movement of the links and the shoe but permitting such movement of the links upon the pivot upon the application of a substantial force.

2. A brake comprising a shoe with a web having an opening at its end and with a pivot a short distance from said end, a pair of anchor links on opposite side of said web and notched at their ends for pivotal engagement with said pivot, friction washers between the links and the opposite sides of said web, a fastening passing through the links and through said washers and through said opening, and a spring cooperating with the fastening and said washers and normally preventing relative movement of the links and the shoe but permitting such movement of the links upon the pivot upon the application of a substantial force.

3. A brake comprising a backing plate having a portion inclined to the general plane of said plate, a shoe mounted on the plate, a setscrew adjustably threaded through said inclined portion of the plate and forming a stop engaging the rim of the shoe, and a spring-pressed ball held from turning with the setscrew and engaging grooves on said setscrew for yieldingly locking the setscrew in adjusted position.

LUDGER E. LA BRIE.